(12) United States Patent
Kubota et al.

(10) Patent No.: US 8,948,765 B2
(45) Date of Patent: Feb. 3, 2015

(54) METHOD AND APPARATUS FOR MAINTAINING A VIRTUAL ACTIVE SET INCLUDING A CLOSED SUBSCRIBER GROUP CELL

(75) Inventors: Keiichi Kubota, Weybridge (GB); Mitsuya Saito, Camberley (GB)

(73) Assignee: Nokia Corporation, Espoo (FI)

( * ) Notice: Subject to any disclaimer, the term of this patent is extended or adjusted under 35 U.S.C. 154(b) by 217 days.

(21) Appl. No.: 13/639,089

(22) PCT Filed: Mar. 25, 2011

(86) PCT No.: PCT/FI2011/050250
§ 371 (c)(1),
(2), (4) Date: Mar. 18, 2013

(87) PCT Pub. No.: WO2011/121175
PCT Pub. Date: Oct. 6, 2011

(65) Prior Publication Data
US 2013/0196671 A1     Aug. 1, 2013

Related U.S. Application Data

(60) Provisional application No. 61/320,495, filed on Apr. 2, 2010.

(51) Int. Cl.
*H04W 88/02*     (2009.01)
*H04W 36/18*     (2009.01)
(Continued)

(52) U.S. Cl.
CPC .............. *H04W 36/18* (2013.01); *H04W 4/08* (2013.01); *H04W 84/045* (2013.01); *H04W 36/0083* (2013.01)
USPC ........................................................ 455/442

(58) Field of Classification Search
USPC ........................................................ 455/442
See application file for complete search history.

(56) References Cited

U.S. PATENT DOCUMENTS 6,449,481 B1    9/2002    Kwon et al.
6,845,238 B1    1/2005    Muller
(Continued)

FOREIGN PATENT DOCUMENTS

CN    1239391    12/1999
CN    1197428    4/2005
(Continued)

OTHER PUBLICATIONS

"3rd Generation Partnership Project; Technical Specification Group Radio Access Network; Radio Resource Control (RRC); Protocol Specification (Release 9)", 3GPP TS 25.331, V9.1.0, Dec. 2009, pp. 1-1759.

(Continued)

*Primary Examiner* — Diane Mizrahi
(74) *Attorney, Agent, or Firm* — Nokia Corporation (57) ABSTRACT

A method, apparatus and computer program product are provided that establishes a virtual active set including a first closed subscriber group (CSG) cell. At least one measured result of each of the first CSG cell and a second CSG cell is measured and the virtual active set is updated by replacing the first CSG cell with the second CSG cell in response to at least one measured result of the second CSG cell having a predefined relationship to the at least one measured result of the first CSG cell for a time to trigger. In regards to updating the virtual active set, the first CSG cell may be replaced with the second CSG cell in response to the at least one measured result of the second CSG cell having a predefined relationship to the at least one measured result of the first CSG cell by at least a predetermined amount for the time to trigger.

18 Claims, 7 Drawing Sheets

(51) Int. Cl.
*H04W 36/00* (2009.01)
*H04W 4/08* (2009.01)
*H04W 84/04* (2009.01)

(56) References Cited

U.S. PATENT DOCUMENTS

| | | | |
|---|---|---|---|
| 6,917,809 B2 | 7/2005 | Horwath et al. | |
| 7,286,801 B2 | 10/2007 | Amerga et al. | |
| 2009/0047968 A1 | 2/2009 | Gunnarsson et al. | |
| 2009/0059871 A1 | 3/2009 | Nader et al. | |
| 2012/0076018 A1* | 3/2012 | Singh et al. | 370/252 |
| 2012/0149429 A1* | 6/2012 | Martin et al. | 455/525 |

FOREIGN PATENT DOCUMENTS

| | | |
|---|---|---|
| JP | 2003-509982 A | 3/2003 |
| JP | 2009-049661 A | 3/2009 |
| JP | 2013-516918 A | 5/2013 |
| WO | 01/20942 A1 | 3/2001 |
| WO | 2008/157817 A | 12/2008 |
| WO | 2011/085204 A1 | 7/2011 |

OTHER PUBLICATIONS

International Search Report and Written Opinion received for corresponding Patent Cooperation Treaty Application No. PCT/FI2011/050250, dated Jun. 13, 2011, 12 pages.

Office action received for corresponding Japanese Patent Application No. 2013-501878, dated Nov. 1, 2013, 2 pages of office action and 3 pages of office action translation.

Office action received for corresponding Japanese Patent Application No. 2013-501878, dated Jul. 31, 2014, 3 pages of office action and 4 pages of office action translation.

Office action received for corresponding Chinese Patent Application No. 201180017706.3, dated Sep. 12, 2014, 7 pages of office action and 2 pages of office summary.

* cited by examiner

METHOD AND APPARATUS FOR MAINTAINING A VIRTUAL ACTIVE SET INCLUDING A CLOSED SUBSCRIBER GROUP CELL

RELATED APPLICATION

This application was originally filed as PCT Application No. PCT/FI2011/050250 filed Mar. 25, 2011, which claims priority to U.S. Provisional Application No. 61/320,495, filed Apr. 2, 2010.

TECHNOLOGICAL FIELD

Embodiments of the present invention relate generally to maintaining and updating a virtual active set and, more particularly, to maintaining and updating a virtual active set that includes a closed subscriber group cell.

BACKGROUND

Some mobile terminals are configured to support communications via two or more carrier frequencies. For mobile terminals that do support communications via two or more frequencies, the communications conducted by the mobile terminal may be handed over from a first carrier frequency to a second carrier frequency in certain circumstances, such as in instances in which the first frequency is more heavily loaded or has deteriorated in signal strength to a point that the second frequency is much stronger.

In order to facilitate inter-frequency handovers, a mobile terminal may maintain a virtual active set. A virtual active set is a set of cells having a carrier frequency that is different than the current carrier frequency being utilized by the mobile terminal for communications. By measuring various parameters of the cells that comprise a virtual active set, such as parameters representative of the signal strength of the cells, the mobile terminal may be prepared to support a soft handover immediately after an inter-frequency handover to the carrier frequency supported by the cells of the virtual active set. In this regard, following an inter-frequency handover, the cells of the virtual active set may comprise an initial active set of cells at the new carrier frequency. As such, the mobile terminal may be prepared to effect a soft handover utilizing a cell of the active set so as to facilitate communications at the new carrier frequency.

In order to construct a virtual active set, the network, such as a radio network controller (RNC), may provide configuration information to the mobile terminal to guide the formation of the virtual active set including the maximum number of cells that are to be included within the virtual active set. A virtual active set may then be defined by the mobile terminal based on measurements that the mobile terminal makes of cells with carrier frequencies different than the current carrier frequency. In this regard, the mobile terminal may select the cells that appear to have the strongest signals or are otherwise the best, such as in terms of downlink received signal code power (RSCP) and/or downlink Ec/N0, and/or the cells that have the lowest downlink path loss from among those cells that support communications on the other carrier frequency. Once the virtual active set has been constructed, the mobile terminal may update the virtual active set based on ongoing measurements of the cells operating at the other carrier frequency.

The network, such as the RNC, may also direct a mobile terminal to make inter-frequency measurements by sending a message, such as a measurement control message, to the mobile terminal. The measurement control message may define the manner in which the mobile terminal will report the inter-frequency measurements to the network. For example, a number of predefined events may be known to both the RNC and the mobile terminal and the measurement control message may indicate the occurrence of which event(s) will trigger the mobile terminal to report the inter-frequency measurements. For example, the events may include a change in the best carrier frequency, a combination of the estimated quality of the current carrier frequency being below a predefined threshold and the estimated quality of another carrier frequency being above a predefined threshold, the estimated quality of another carrier frequency being above a predefined threshold, the estimated quality of the current carrier frequency being below a predefined threshold, the estimated quality of another carrier frequency being below a predefined threshold or the estimated quality of the current carrier frequency being above a predefined threshold. The mobile terminal may gather the inter-frequency measurements of the cells operating at the other frequency and may monitor the measurements to determine if the event of interest, as defined by the measurement control message, has occurred. If the event of interest has occurred, the mobile terminal may provide the measurements to the network, such as to the RNC, via a measurement report. Alternatively, if the event of interest has not occurred, the mobile terminal may continue to collect the measurements.

Although useful in supporting inter-frequency handovers between macro cells, the inter-frequency handover process is generally less effective or even ineffective with respect to a mobile terminal that desires to transition from a macro cell to a femto cell, such as a home node B. In this regard, a mobile terminal cannot generally maintain a virtual active set that includes both macro cells and femto cells as the measurements related to the macro cell will be materially different than the measurements for a femto cell.

Recently, efforts have been made to enable the provision of closed subscriber groups (CSGs) to enable restricted access to particular CSG cells, such as particular femto cells, e.g., home node Bs, for particular groups of subscribers. CSGs may be useful for particular organizations or businesses that wish to define a group of users that may be enabled to freely access a base station, node or access point associated with the CSG, but may have restrictions for enabling access to the cell by individuals outside of the group. CSGs may also be useful in connection with individually established networks within private homes. In this regard, for example, a CSG may typically define a group of users (e.g., subscribers) that are enabled to access a particular CSG cell. As such, individuals that are not members of the group may not be able to access the CSG cell. Inbound mobility to a CSG cell on a carrier frequency that is different than the current carrier frequency being utilized by the mobile terminal for communications may be somewhat challenging, however, since measurement evaluations based on a virtual active set that includes one or more CSG cells are not suitable for CSG cells since mobile terminals are not generally configured to affect a soft handover between CSG cells.

BRIEF SUMMARY

A method, apparatus and computer program product are therefore provided for establishing and updating a virtual active set that includes a CSG cell. As such, the method, apparatus and computer program product of one embodiment facilitates the handover to a CSG cell and/or system information acquisition on a CSG cell in instances in which the CSG cell satisfies a predefined criteria.

In one embodiment, a method is provided that establishes a virtual active set including a first CSG cell. The method of this embodiment also measures at least one measured result of each of the first CSG cell and a second CSG cell and updates the virtual active set by replacing the first CSG cell with the second CSG cell in response to at least one measured result of the second CSG cell having a predefined relationship to the at least one measured result of the first CSG cell for a time to trigger. In one embodiment, the virtual active set only includes a single CSG cell. In regards to updating the virtual active set, the method of one embodiment may replace the first CSG cell with the second CSG cell in response to the at least one measured result of the second CSG cell having a predefined relationship to the at least one measured result of the first CSG cell by at least a predetermined amount for the time to trigger.

In another embodiment, an apparatus is provided that includes at least one processor and at least one memory including computer program code. The at least one memory and the computer program code are configured to, with the at least one processor, cause the apparatus at least to establish a virtual active set including a first CSG cell. The at least one memory and the computer program code of this embodiment are also configured to, with the at least one processor, cause the apparatus to measure at least one measured result of each of the first CSG cell and a second CSG cell and to update the virtual active set by replacing the first CSG cell with the second CSG cell in response to the at least one measured result of the second CSG cell having a predefined relationship to the at least one measured result of the first CSG cell for a time to trigger. The at least one memory and the computer program code of one embodiment may be configured to, with the at least one processor, cause the apparatus to establish the virtual active set and update the virtual active set by insuring that the virtual active set only includes a single CSG cell. The at least one memory and the computer program code of one embodiment may also be configured to, with the at least one processor, cause the apparatus to update the virtual active set by replacing the first CSG cell with the second CSG cell in response to the at least one measured result of the second CSG cell having a predefined relationship to the at least one measured result of the first CSG cell by at least a predefined amount for the time to trigger.

In a further embodiment, a computer program product is provided that includes at least one computer-readable storage medium having computer-executable program code instructions stored therein. The computer-executable program code instructions include program code instructions for establishing a virtual active set including a first CSG cell, program code instructions for measuring at least one measured result of each of the first CSG cell and the second CSG cell and program code instructions for updating the virtual active set by replacing the first CSG cell with the second CSG cell in response to the at least one measured result of the second CSG cell having a predefined relationship to the at least one measured result of the first CSG cell for a time to trigger. The program code instructions for establishing a virtual active set and updating the virtual active set may include program code instructions for insuring that the virtual active set only includes a single CSG cell. The program code instructions for updating the virtual active set may include program code instructions for replacing the first CSG cell with the second CSG cell in response to the at least one measured result of the second CSG cell having a predefined relationship to the at least one measured result of the first CSG cell by at least a predefined amount for the time to trigger.

The method, apparatus and computer program product of at least some embodiments of the present invention therefore permit a CSG cell to be evaluated by the mobile terminal and reported to the RNC. By requiring that the virtual active set only be updated in instances in which a measured result of a second CSG cell has a predefined relationship to a measured result of the first CSG cell for a time to trigger, the method, apparatus and computer program product of one embodiment may avoid excessive changes to the virtual active set. And, in one embodiment, by also requiring the single and unique CSG cell of the virtual active set meets the criteria for inter-frequency event reporting for a predetermined period of time, the method, apparatus and computer program product may limit the number of times that measurement results relating to a CSG cell will be reported, thereby avoiding network congestion and consumption of bandwidth. However, by separately measuring a CSG cell, an inter-frequency handover to the CSG cell and/or system information acquisition on a CSG cell is facilitated as the CSG cell is treated uniquely relative to macro cells.

BRIEF DESCRIPTION OF THE DRAWINGS

Having thus described some embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Embodiments of the present invention may relate to the establishment and updating of a virtual active set for a closed subscriber group (CSG) cell, such as a femto cell, e.g., a home node B. By maintaining a virtual active set that includes a CSG cell and, in one embodiment, only a CSG cell, inbound mobility to a CSG cell operating on a carrier frequency that is different than the current carrier frequency that is utilized by a mobile terminal for communications is facilitated by facilitating inter-frequency handover from a macro cell that was previously servicing the mobile terminal to the CSG cell. Moreover, the method, apparatus and computer program product of some embodiments may be configured so as to require at least one measured result of the single and unique CSG cell that comprises the virtual active set meets the criteria for inter-frequency event reporting for at least a predetermined period of time prior to advising the network of the measurement results for the CSG cell. As described below, in instances in which the CSG cell of the virtual active set meets the criteria for inter-frequency reporting, but the virtual active set has been recently updated to include the CSG cell, the method, apparatus and computer program product may not immediately report to the network, but may, instead, require the CSG cell of the virtual active set to continue to meet the criteria for inter-frequency reporting for at least a predefined period of time, such as a time to trigger, prior to issuing a report to the network. In order to limit the number of times that the virtual active set is changed, the method, apparatus and computer program product of one example embodiment may only change the CSG cell of the virtual active set from a first CSG cell to a second CSG cell in instances in which the measurement results of the second CSG cell has a predefined relationship to those of the first CSG cell for a predefined period of time, such as a time to trigger. Additionally, the method, apparatus and computer program product of one example embodiment may also require the measurement results of the second CSG cell to not only have a predefined relationship to those of the first CSG cell, but to differ from those of the first CSG cell by at least a predefined amount prior to updating the virtual active set to include the second CSG cell, instead of the first CSG cell.

Figure 1:
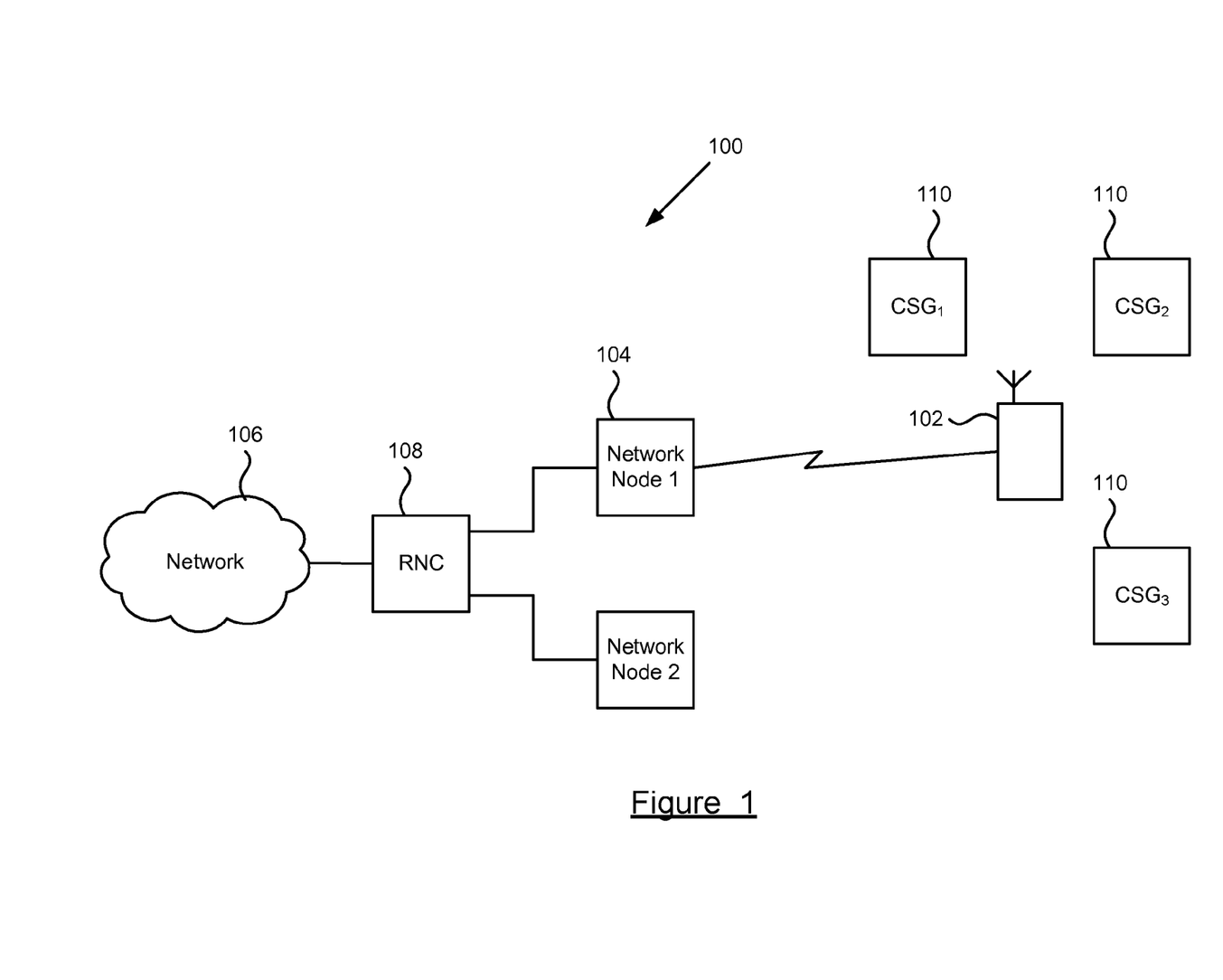
FIG. 1 is a block diagram of a system in accordance with one embodiment of the present invention.

The method, apparatus and computer program product of one embodiment may be employed in conjunction with a variety of networks that include one or more macro cells and a plurality of CSG cells. For example, FIG. 1 illustrates a block diagram of a system 100 for establishing and updating a virtual active set including a CSG cell according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for establishing and updating a virtual active set including a CSG cell, numerous other configurations may also be used to implement embodiments of the present invention. In at least some embodiments, the system 100 includes one or more mobile terminals 102 and one or more network nodes 104 for defining respective cells for supporting communications with the mobile terminals. In at least some embodiments, the system further comprises a network 106. The network may comprise one or more wireline networks, one or more wireless networks, or some combination thereof. In one embodiment, the network comprises a public land mobile network (e.g., a cellular network), such as may be implemented by a network operator (e.g. a cellular access provider). The network may operate in accordance with universal terrestrial radio access network (UTRAN) standards, evolved UTRAN (E-UTRAN) standards, GSM (Global System for Mobile communications) EDGE (Enhanced Data GSM Environment) radio access network (GERAN) standards and/or the like. It will be appreciated, however, that where references herein are made to a network standard and/or terminology particular to a network standard, the references are provided merely by way of example and not by way of limitation.

The network node 104 may comprise any network entity configured to communicate with a mobile terminal 102, such as to support the establishment of a connection with the mobile terminal to the network node. In this regard, the network node may comprise, for example, a base station (BS), such as a Node B in accordance with the UTRAN standard. As such, in some embodiments, the network node is configured to provide access to the network 108 for the user equipment. In this regard, the system 100 may also include a radio network controller (RNC) 108 that at least partially controls the operations of one or more network nodes and that facilitates communication between the network nodes and the network.

In addition to the network nodes 104, the mobile terminal 102 may also establish communications with one or more CSG cells 110, three of which are designated as $CSG_1$, $CSG_2$ and $CSG_3$ in the embodiment of FIG. 1. For example, the CSG cells may be defined by respective home node Bs for which the mobile terminal may have access rights and with which the mobile terminal may therefore communicate.

Figure 2:
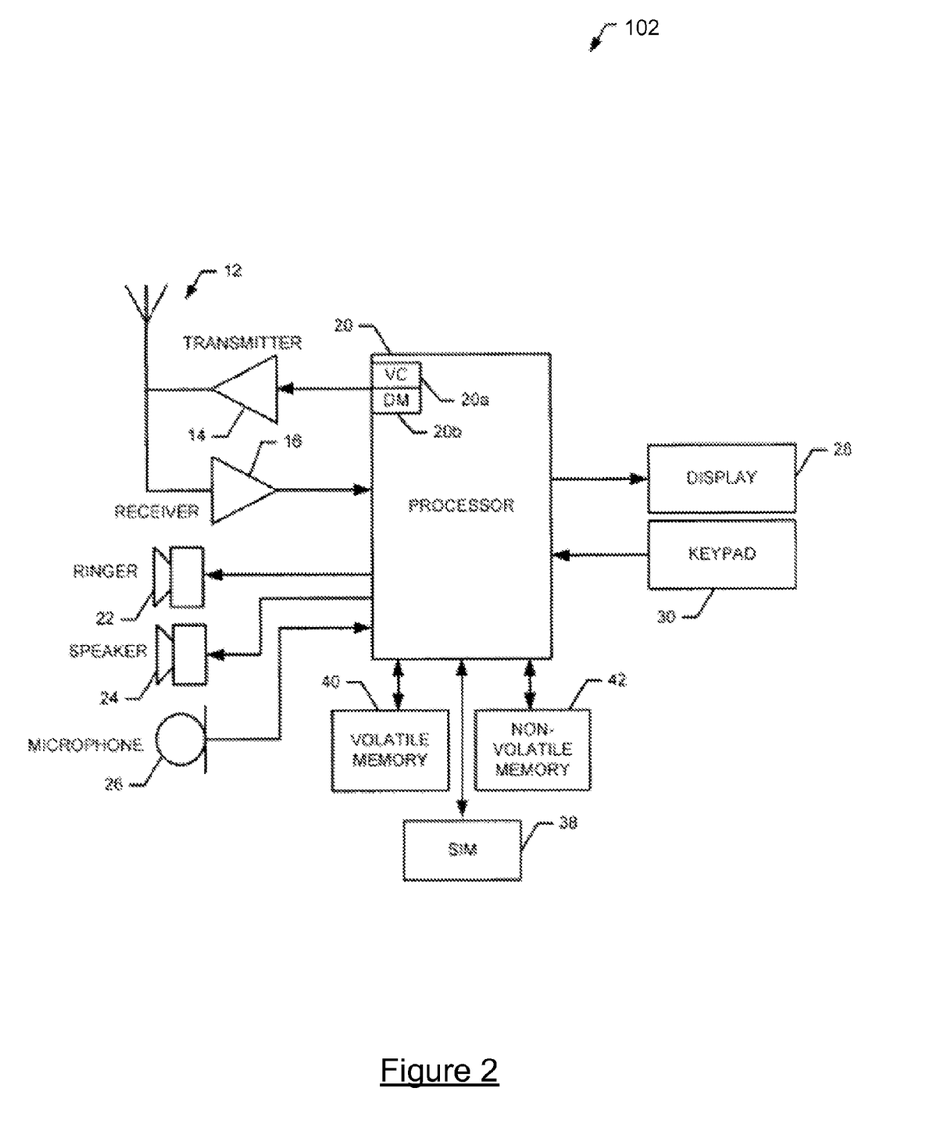
FIG. 2 is a block diagram of a mobile terminal in accordance with one embodiment of the present invention.

The mobile terminal 102 may be embodied in various forms including a desktop computer, laptop computer, mobile computer, mobile phone, mobile communication device, game device, digital camera/camcorder, audio/video player, television device, radio receiver, digital video recorder, positioning device, any combination thereof, and/or the like. For purposes of illustration but not of limitation, FIG. 2 illustrates a block diagram of one example of a mobile terminal. It should be understood, however, that the mobile terminal illustrated and hereinafter described is merely illustrative of one type of mobile terminal that may implement and/or benefit from embodiments of the present invention and, therefore, should not be taken to limit the scope of the present invention. While one embodiment of the mobile terminal is illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 102 may include an antenna 12 (or multiple antennas) in communication with a transmitter 14 and a receiver 16. The mobile terminal may also include a processor 20 configured to provide signals to and receive signals from the transmitter and receiver, respectively. The processor may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor comprises a plurality of processors. The signals sent and received by the processor may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), UTRAN and/or the like. The mobile terminal may be additionally capable of operating in accordance with 3.9G wireless communication protocols such as LTE, LTE-Advanced or E-UTRAN and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 102 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 102. For example, the processor may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor may be capable of operating a connectivity program, such as a web browser. The connectivity program may allow the mobile terminal to transmit and receive web content, such as location-based content, according to a protocol, such as Wireless Application Protocol (WAP), hypertext transfer protocol (HTTP), and/or the like. The mobile terminal may be capable of using a Transmission Control Protocol/Internet Protocol (TCP/IP) to transmit and receive web content across the internet or other networks.

The mobile terminal 102 may also comprise a user interface including, for example, an earphone or speaker 24, a ringer 22, a microphone 26, a display 28, a user input interface, and/or the like, which may be operationally coupled to the processor 20. In this regard, the processor may comprise user interface circuitry configured to control at least some functions of one or more elements of the user interface, such as, for example, the speaker, the ringer, the microphone, the display and/or the like. The processor and/or user interface circuitry comprising the processor may be configured to control one or more functions of one or more elements of the user interface through computer program instructions (e.g., software and/or firmware) stored on a memory accessible to the processor (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 102 may comprise memory, such as one or more subscriber identity modules (SIMs) 38, universal SIMs (USIMs), removable user identity modules (R-UIMs), and/or the like, which may store information elements related to a mobile subscriber. In addition to the SIM, the mobile terminal may comprise other removable and/or fixed memory. The mobile terminal may include volatile memory 40 and/or non-volatile memory 42. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory, non-volatile memory may include a cache area for temporary storage of data. The memories may store one or more software programs, instructions, pieces of information, data, and/or the like which may be used by the mobile terminal for performing functions of the mobile terminal. For example, the memories may store instructions which, when executed by the processor, cause the processor to perform the functions described herein. The memories may also comprise an identifier, such as an international mobile equipment identification (IMEI) code, capable of uniquely identifying the mobile terminal.

Figure 3:
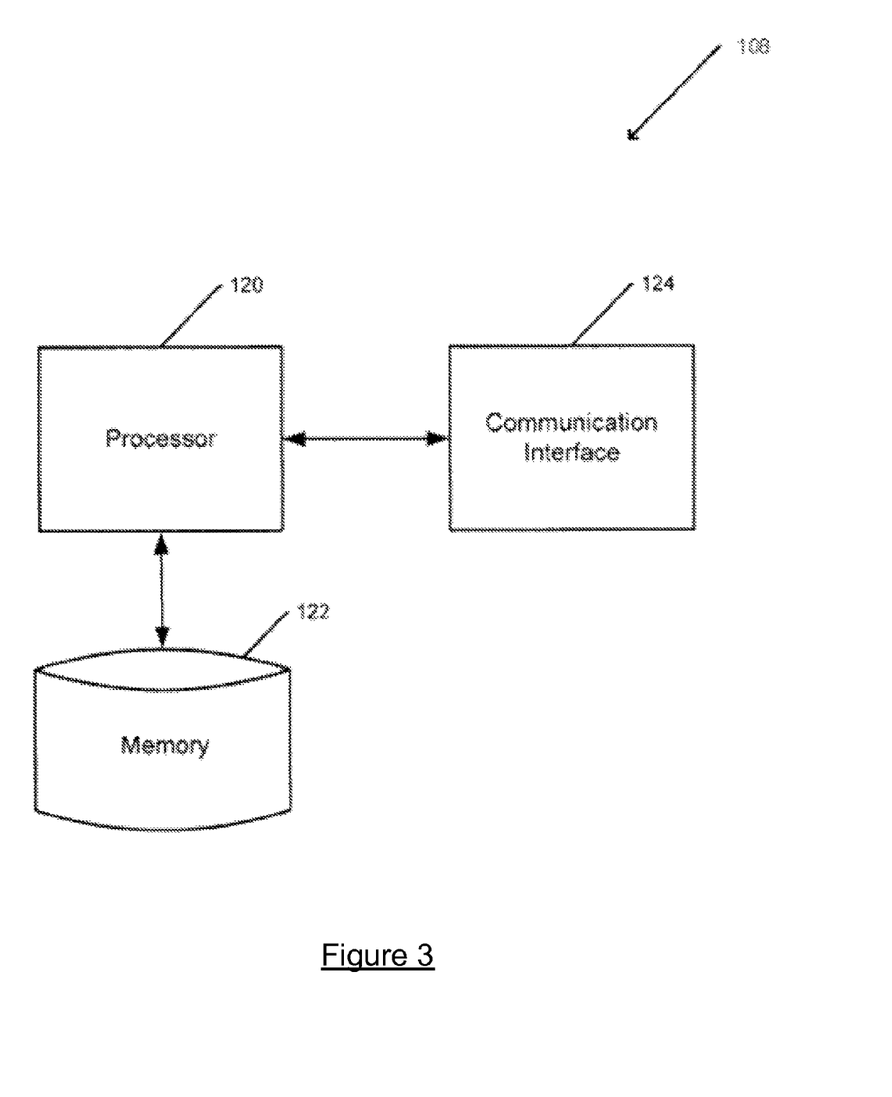
FIG. 3 is a block diagram of a radio network controller, in accordance with one embodiment of the present invention.

Referring now to FIG. 3, a block diagram of a radio network controller (RNC) 108 is provided according to an example embodiment of the invention. In the example embodiment illustrated in FIG. 3, the RNC may include various means, such as a processor 120, memory 122 and communication interface 124 for performing the various functions herein described. These means of the RNC as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory) that is executable by a suitably configured processing device (for example, the processor), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some embodiments the processor comprises a plurality of processors. The plurality of processors may be in operative communication with each other and may be collectively configured to perform one or more functionalities of the RNC 108 as described herein. In an example embodiment, the processor is configured to execute instructions stored in the memory 122 or otherwise accessible to the processor. These instructions, when executed by the processor, may cause the RNC to perform one or more of the functionalities of RNC as described herein and depicted, for example, in FIG. 5. As such, whether configured by hardware or software methods, or by a combination thereof, the processor may comprise an entity capable of performing operations according to embodiments of the present invention while configured accordingly. Thus, for example, when the processor is embodied as an ASIC, FPGA or the like, the processor may comprise specifically configured hardware for conducting one or more operations described herein. Alternatively, as another example, when the processor is embodied as an executor of instructions, such as may be stored in the memory, the instructions may specifically configure the processor to perform one or more algorithms and operations described herein.

The memory 122 may comprise, for example, volatile memory, non-volatile memory, or some combination thereof. Although illustrated in FIG. 3 as a single memory, the memory may comprise a plurality of memories. In various embodiments, the memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory may be configured to store information, data, applications, instructions, and/or the like for enabling the RNC 108 to carry out various functions in accordance with example embodiments of the present invention. For example, in at least some embodiments, the memory is configured to buffer input data for processing by the processor 120. Additionally or alternatively, in at least some embodiments, the memory is configured to store program instructions for execution by the processor. The memory may store information in the form of static and/or dynamic information.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another entity, such as over a network 106 and/or from a network node 104. In at least one embodiment, the communication interface is at least partially embodied as or otherwise controlled by the processor. In this regard, the communication interface may be in communication with the processor, such as via a bus. The communication interface may include, for example, an antenna, a transmitter, a receiver, a transceiver and/or supporting hardware or software for enabling communications with one or more computing devices or entities over the network. The communication interface may be configured to receive and/or transmit data using any protocol that may be used for communications between the RNC 108 and one or more other computing devices over the network (e.g., the a service provider, network access point, and/or the like). The communication interface may additionally be in communication with the memory, such as via a bus.

As described below, the mobile terminal 102, such as the processor 20, makes the measurements of signal strength, measurements of downlink path loss or the like associated with each CSG cell 110, and then identifies the CSG cell that comprises the virtual active set to the network, such as to the RNC 108, in response to the occurrence of one of the predefined events. As described below, however, the method, apparatus and computer program product of one embodiment impose restrictions upon the manner in which inter-frequency event reporting is triggered by utilizing a time to trigger so as to limit the number of instances in which the mobile terminal, such as a processor, advises the RNC of a satisfaction of the criteria of inter-frequency event reporting with the CSG cell that comprises the virtual active set and/or a change in the CSG cell that comprises the virtual active set.

Figure 4:
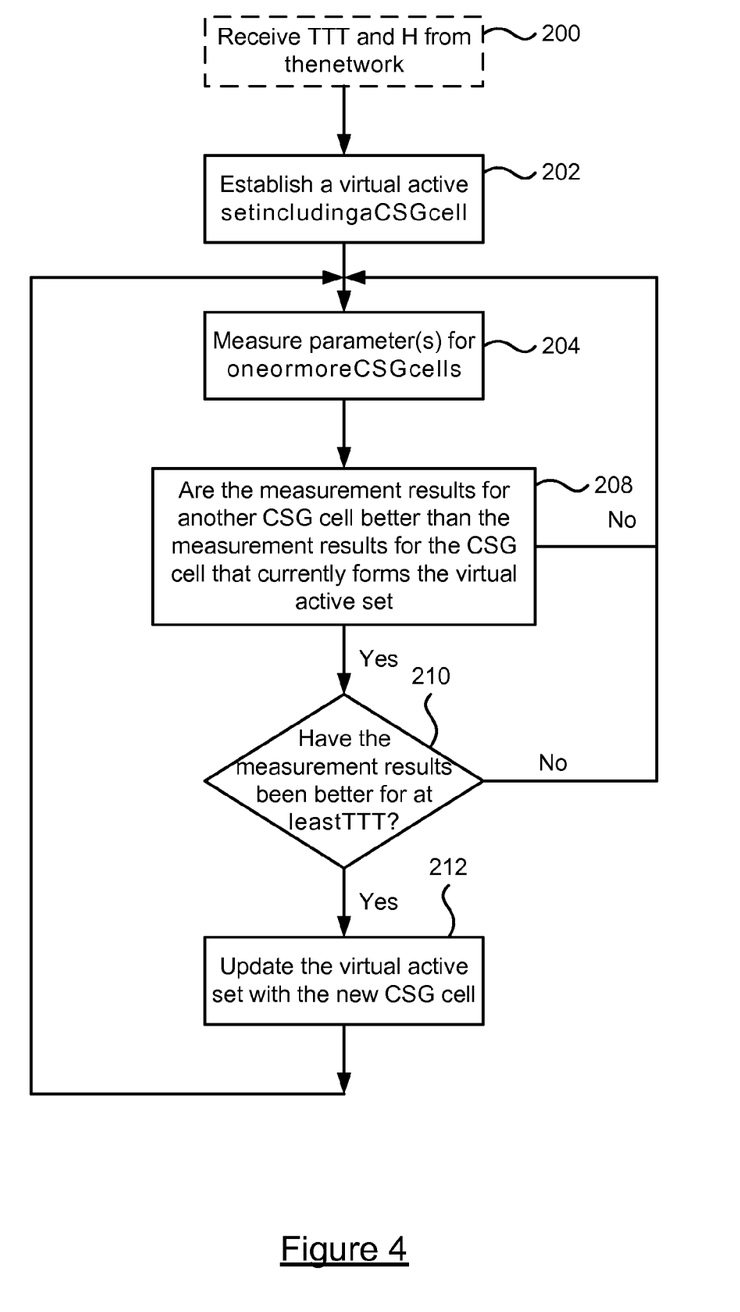
FIG. 4 is a flow chart illustrating operations performed by a mobile terminal in order to establish and maintain a virtual active set including a CSG in accordance with one embodiment of the present invention.

In one embodiment illustrated in FIG. 4, the mobile terminal 102, such as the processor 20, may initially establish the virtual active set. See operation 202. In this regard, the processor may establish the virtual active set so as to include a single CSG cell 110. For example, the processor may make measurements of the communications link with one or more CSG cells with which the mobile terminal is capable of establishing communications. The mobile terminal, such as the processor, may make various measurements of the communications link, such as measurements of the signal strength, e.g., downlink RSCP or downlink Ec/N0, measurements of downlink path loss and the like. Regardless of the specific type of measurements, however, the processor obtains measurement results for each of the CSG cells. By comparing the measurement results, the mobile terminal, such as the processor, may identify the CSG cell that provides the best measurement results, such as the greatest signal strength, the smallest downlink path loss or the like. The CSG cell that provides the best measurement results may then be identified by the mobile terminal, such as the processor, as the CSG cell that initially comprises the virtual active set.

Thereafter, the mobile terminal 102, such as the processor 20, may continue to obtain measurement results for the CSG cell 110 that comprises the virtual active set, as well as one or more other CSG cells with which the mobile terminal may establish communications. See operation 206. As before, the mobile terminal, such as the processor, may compare the measurement results to determine if the measurement results from another CSG cell are better than those of the CSG cell that comprises the virtual active set, such as by having a greater signal strength or a lower downlink path loss. See operation 208. In order to avoid repeated changes to the composition of the virtual active set, the mobile terminal, such as the processor, of one embodiment may require the measurement results of another CSG cell to not simply be momentarily better than the measurement results of the CSG cell that comprises the virtual active set, such as by satisfying a predefined relationship with respect to the measurement results of the CSG cell that comprises the virtual active cell for a moment, but to, instead, be continuously better than the measurement results of the CSG cell that currently comprises the virtual active set, such as by continuously satisfying the predefined relationship, for a predefined period of time, such as a time to trigger. See operation 210. As such, only if the mobile terminal, such as the processor, determines that the measurement results for another CSG cell are better than the measurement results of the CSG cell that currently comprises the virtual active cell, such as by satisfying the predefined relationship, for at least the predefined period of time will the mobile terminal change the composition of the virtual active set by replacing the original CSG cell with the other CSG cell that now provides better measurement results.

In one embodiment, the mobile terminal 102, such as a processor 20, may not only require the measurement results for another CSG cell 110 to be better than those of the CSG cell that currently comprises the virtual active cell, such as by satisfying a predefined relationship, for at least a predetermined period of time, such as a time to trigger, but the mobile terminal, such as the processor, of one embodiment may alternatively or additionally require the measurement results for the other CSG cell to differ from those of the CSG cell that currently comprises the virtual active set by at least a predefined amount. For example, with respect to signal strength measurements, the measurement results for the other CSG cell may be required to have a predefined relationship to those of the CSG cell that currently comprises the virtual active set by at least a predefined amount. Similarly, with respect to downlink path loss measurements, the measurement results for the other CSG cell may be required to be less than those of the CSG cell that currently comprises the virtual active set by at least a predefined amount. In either instance, the measurement results for the other CSG cell may not be considered sufficiently better than those of the CSG cell that currently comprises the virtual active set in instances in which the measurement results for the other CSG cell are only slightly different than those of the CSG cell that currently comprises the virtual active set. Instead, the measurement results of the other CSG cell must differ from those of the CSG cell that currently comprises the virtual active set by at least a predefined amount as shown in operation 208 and, in one embodiment, by at least a predefined amount for a predefined period of time. In this regard, the predefined amount may be defined in terms of a Hysterisis parameter H. As such, the mobile terminal, such as the processor, of one embodiment may obtain measurement results $M_{new}$ for another CSG cell as well as measurement results $M_{InVAS}$ for the CSG cell that comprises the virtual active set. In instances in which the measurement results $M_{new}$ are considered better by exceeding the measurement results $M_{InVAS}$, such as in instances in which signal strength, e.g., downlink RSCP or downlink Ec/N0, is measured, the mobile terminal, such as the processor, may only change the virtual active set to include the other CSG cell instead of the current CSG cell in instances in which the measurement results satisfy the following equation in a repeated manner for at least a predefined period of time, such as a time to trigger (TTT):

$$10 \log M_{new} \geq 10 \log M_{InVAS} + H/2$$

Alternatively, in instances in which the measurement results $M_{new}$ are considered better by being less than the measurement results $M_{InVAS}$, such as in instances in which downlink path loss is measured, the mobile terminal 102, such as the processor 20, may only change the virtual active set to include the other CSG cell instead of the current CSG cell in instances in which the measurement results satisfy the following equation in a repeated manner for at least a predefined period of time, such as a time to trigger (TTT):

$$10 \log M_{new} \leq 10 \log M_{InVAS} - H/2$$

In instances in which the predefined relationship is satisfied for the predetermined period of time, the mobile terminal 102, such as the processor 20, may update the virtual active set to include the other CSG cell 110 instead of the prior CSG cell. See, for example, operation 212 of FIG. 4. By only changing the composition of the virtual active set in instances in which the measurement results for another CSG cell 110 are better than those of the CSG cell that currently comprises the virtual active set for at least a predetermined period of time, such as a time to trigger, and, in one embodiment, by also requiring the measurement results for the other CSG cell to be better than those of the CSG cell that currently comprises the virtual active set by at least a predefined amount, the number of instances in which the composition of the virtual active set will change may be limited or otherwise reduced. As described below, the change in the composition of the virtual active set may also cause the mobile terminal, such as the processor, to reset a timer that is utilized to determine if an inter-frequency event reporting triggering condition has been met for a predefined period of time as described below in conjunction with operation 308 of FIG. 5, thereby further limiting the network reporting obligations so as to avoid network congestion and bandwidth consumption.

Figure 5:
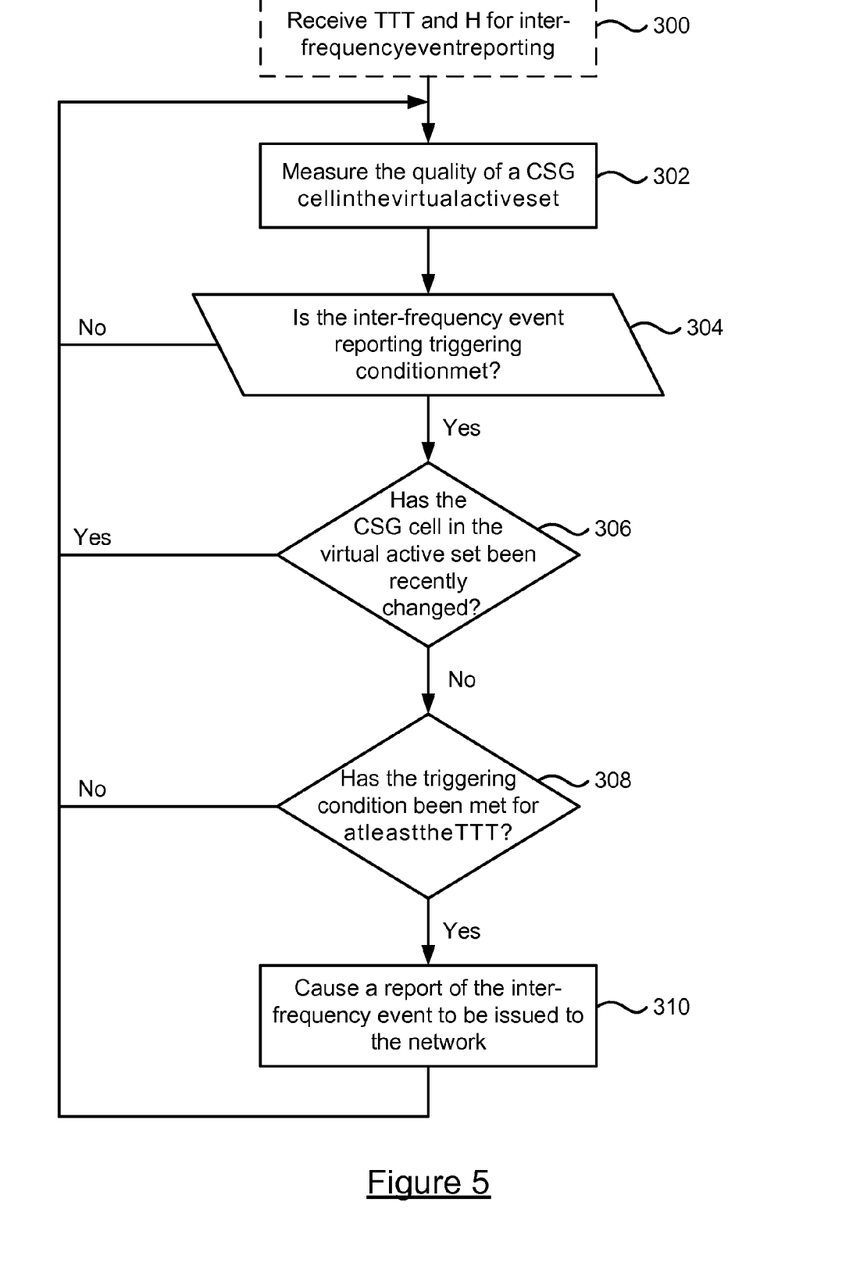
FIG. 5 is a flow chart illustrating operations performed by a mobile terminal in order to provide for inter-frequency event reporting in accordance with one embodiment of the present invention.

In addition to the intra-frequency measurements as described above in conjunction with FIG. 4, the mobile terminal 102, such as the processor 20, may also support inter-frequency event reporting, one example of which is shown in FIG. 5. In this regard, the mobile terminal, such as the processor, may determine if any of one or more predefined events have occurred so as to trigger reporting to the network, such as the RNC 108, of the CSG cell 110 that comprises the virtual active set and the measurements associated with that CSG cell. In one embodiment, the mobile terminal may optionally receive the predefined time, such as a time to trigger (TTT), and the Hysteresis parameter H. See operation 300 of FIG. 5 in which the dashed lines visually indicate the optional nature of this operation. The TTT and H values utilized for inter-frequency event reporting may be the same or different than the TTT and H values that are received by the mobile terminal, such as in operation 200 of FIG. 4, and utilized in conjunction with intra-frequency measurements.

As shown in operation 302 of FIG. 5, the mobile terminal 102, such as the processor 20, may then measure the quality of the CSG cell 110 in the virtual active set, such as by obtaining measurements of the signal strength, the downlink path loss or the like. Based on the measurements, the mobile terminal, such as the processor, may determine if an inter-frequency event reporting triggering condition has been met. See operation 304. As described above, various inter-frequency event reporting triggering conditions may be defined, such as the estimated quality of the CSG cell being greater than a predefined value. If the inter-frequency event reporting triggering condition has not been met, the mobile terminal may continue to measure the quality of the CSG cell in the virtual active set and then again determine if an inter-frequency event reporting triggering condition has been met.

If, however, the mobile terminal 102, such as the processor 20, determines that the inter-frequency event reporting triggering condition has been met, the mobile terminal, such as the processor, may determine if the CSG cell 110 that comprises the virtual active set has been changed, such as since the measurements have been obtained in operation 302. See operation 306. If the CSG cell that comprises the virtual active set has changed, the mobile terminal may forego further analysis based on the measurement results since the measurement results are now outdated (in that the measurement results apply to a CSG cell that is no longer included within the virtual active set) and may, instead, continue to measure the quality of the CSG cell in the virtual active set and then again determine if an inter-frequency event reporting triggering condition has been met prior to again determining if the CSG cell that comprises the virtual active set has changed.

If the CSG cell 110 that comprises the virtual active set has not changed since the measurement results were obtained in operation 302, the mobile terminal 102, such as the processor 20, may then determine if the triggering condition has been satisfied for at least a predefined period of time, such as the time to trigger. See operation 308. For example, the mobile terminal may include a timer that measures the length of time that the inter-frequency event reporting triggering condition has been met such that the value of the timer may be compared to the predefined period of time to see if the triggering condition has been satisfied for a sufficiently long time. In one embodiment, the mobile terminal, such as the processor, resets the timer upon changing the CSG cell that comprises the virtual active set. Thus, a comparison of the timer to the predefined period of time, such as the TTT, will insure that the triggering condition has been met with respect to the CSG cell that currently comprises the virtual active set for the desired length of time.

If the triggering condition has not been satisfied for the predefined period of time, the mobile terminal 102 may continue to measure the quality of the CSG cell 110 in the virtual active set and repeat the process as described above. If, however, the triggering condition is determined to have been satisfied for at least the predefined period of time, the mobile terminal, such as the processor 20, may cause a report of the inter-frequency event to be issued to the network, such as the RNC 108. See operation 310. Among other things, this report may identify the CSG cell that comprises the virtual active set as well as measurement results associated with the CSG cell. By requiring the triggering condition is determined to have been satisfied for at least the predefined period of time prior to causing a report to be issued to the network, the method, apparatus and computer program product of one embodiment advantageously conserve network resources and avoids unnecessary bandwidth consumption.

In one embodiment, a network element, such as the RNC 108, may communicate with the mobile terminal 102, such as by means of a measurement control message, to advise the mobile terminal to maintain a virtual active setting and to also provide the time to trigger (TTT) parameter and, in one embodiment, the Hysteresis parameter H. As shown in operation 200 of FIG. 4 and operation 300 of FIG. 5, the network element, such as the RNC, may provide TTT and H for the intra-frequency measurements and for the inter-frequency event reporting as shown in FIG. 5. As noted above, these values may be the same for both the intra-frequency measurements and the inter-frequency event reporting or different. The network, such as the RNC, may also provide a replacement activation threshold, a reporting deactivation threshold and/or a reporting range which effectively define the size of the virtual active set. For example, the replacement activation threshold may be set to zero or one so as to limit the virtual active set to a single CSG cell 110. By way of another example, the reporting deactivation threshold may be set to zero or one so as to limit the virtual active set to a single CSG cell. As yet another example, the reporting range may be set to zero so as to insure that the intra-frequency reporting criteria are only met if a CSG cell not in the virtual active set is better than or equal to the CSG cell in the virtual active set. The mobile terminal may then establish the virtual active set including a CSG cell. See operation 202 of FIG. 4. The mobile terminal, such as the processor 20, may then measure the CSG cells with which the mobile terminal may establish communication and determine if the composition of the virtual active set should be changed, such as in the manner described above. See operations 206-210. In instances in which the mobile terminal, such as the processor, may determine that another CSG cell should be included in the virtual active set instead of the current CSG cell, the mobile terminal may redefine the virtual active set as per operation 212. This process may be repeated so that the mobile terminal, such as a processor, maintains an updated virtual active set. Moreover, the mobile terminal, such as the processor, may concurrently perform the analysis associated with inter-frequency event reporting as set forth by FIG. 5 to determine when the network, such as the RNC, should be advised of the CSG cell that comprises the virtual active set.

In order to further reduce the signaling from the network, such as the RNC 108, to the mobile terminal 102 and, accordingly, to avoid changes to the radio resource control (RRC) interface, the mobile terminal may be configured to alter the composition of an active set by replacing one intra-frequency cell with another intra-frequency cell upon the occurrence of a predefined event (e.g., event 1C) that is otherwise utilized by the mobile terminal, such as a processor 20, in conjunction with the timing of a measurement report by the mobile terminal, such as described above in conjunction with FIG. 4, during the maintenance of a virtual active set of CSG cells. For example, the mobile terminal, such as the processor, may include a predefined type of event, such as an event that requires the mobile terminal, such as the processor, to replace one intra-frequency cell with another intra-frequency cell, in an instance in which the signal strength of the common pilot channel (CPICH) of another intra-frequency cell is greater than the signal strength of the CPICH of the intra-frequency cell that currently comprises the active set. As indicated by FIG. 5, this predefined type of event may be utilized by the mobile terminal to identify instances in which a mobile terminal should switch from the current CSG cell that comprises the virtual active set to another CSG cell upon the occurrence of a predefined event. According to this embodiment, the same predefined type of event may be utilized by the mobile terminal, such as the processor, to identify an instance in which the virtual active set containing a first CSG cell should be redefined so as to include another CSG cell having a CPICH with a greater signal strength. Thus, the determination as to whether the measurement results of another CSG cell are better than those of the CSG cell that currently forms the virtual active set as set forth by operation 208 of FIG. 4 may be satisfied, in this embodiment, by the occurrence of a predefined event. As described above, the mobile terminal 102, such as the processor 20, may also impose time to trigger and/or Hysteresis requirements upon the analysis of the signal strengths of the CSG cells 110 in order to limit the instances in which the composition of the virtual active set is changed and, accordingly, to limit the network signaling and bandwidth consumption that accompanies a change in the virtual active set. The mobile terminal of other embodiments may employ other predefined types of events including, for example, an event based on the other intra-frequency cell entering the reporting range of the best intra-frequency cell in terms of the measurement results (e.g. event 1A).

In a further embodiment, the mobile terminal 102, such as the processor 20, may determine the predefined period of time, such as a time to trigger, for which the measurement results of the CSG cell 110 that comprises the virtual active set satisfies the criteria of inter-frequency event reporting based upon a predefined period of time, such as a time to trigger, that is utilized for other purposes, such as provided in accordance with operation 200 of FIG. 4 and utilized to define the period of time for which the measurement results for another CSG cell must have a predefined relationship to those of the CSG cell that currently comprises the virtual active cell. Indeed, the predefined period of time, such as a time to trigger, utilized for purposes of determining whether another CSG cell should replace the CSG cell that currently comprises the virtual active set may be defined to be N times the predefined period of time that is utilized for other purposes. In this regard, N is set to a predefined value. As such, the network, such as the RNC 108, need not provide the predefined period of time to the mobile terminal since the mobile terminal may determine the predefined period of time from information that is already stored or maintained by the mobile terminal, thereby simplifying the interface between the RNC and the mobile terminal. In this regard, the predefined value of N may be hard-coded or otherwise predefined by the mobile terminal, such as in accordance with a standard. Alternatively, the RNC may provide the value of N to the mobile terminal. Additionally, the mobile terminal, such as the processor, of one embodiment, may utilize a Hysteresis value that is either set to 0 or to another predefined value, such as established by a standard, so as to further reduce the signaling required from the network, such as the RNC, to the mobile terminal.

Figure 6:
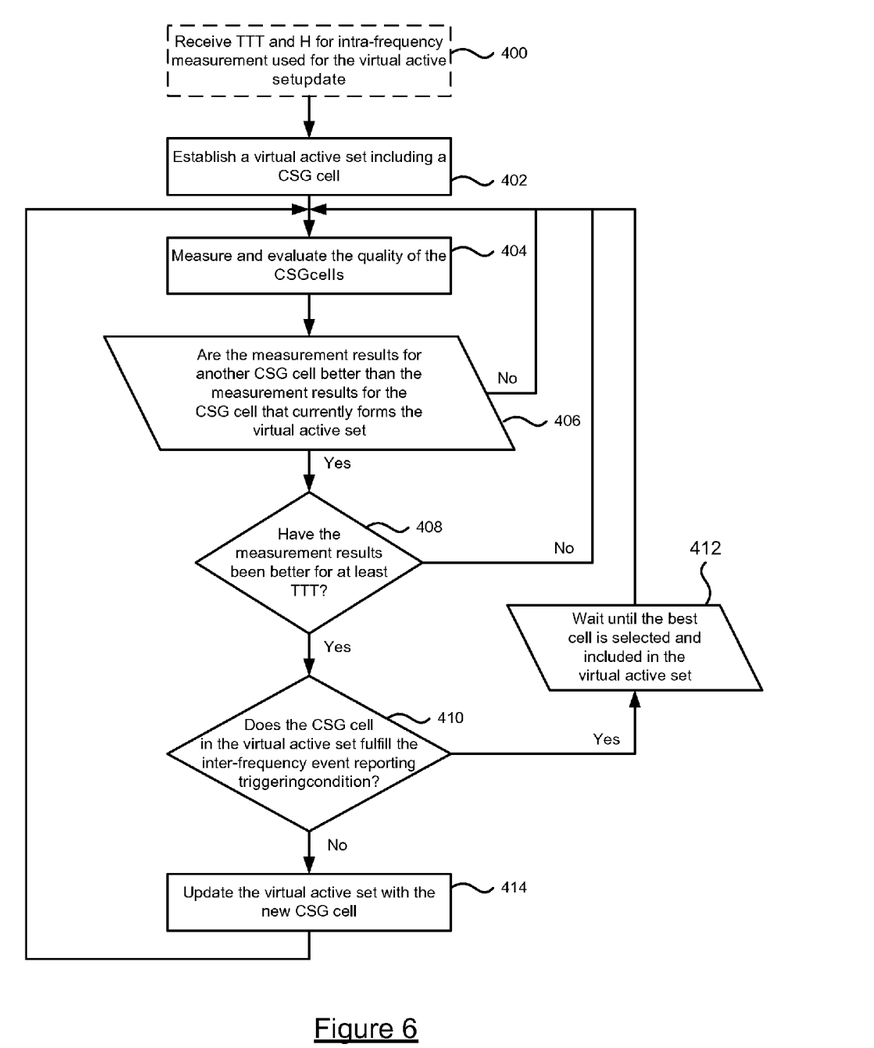
FIG. 6 is a flow chart illustrating operations performed by a mobile terminal in order to establish and maintain a virtual active set including a CSG in accordance with another embodiment of the present invention.
Figure 7:
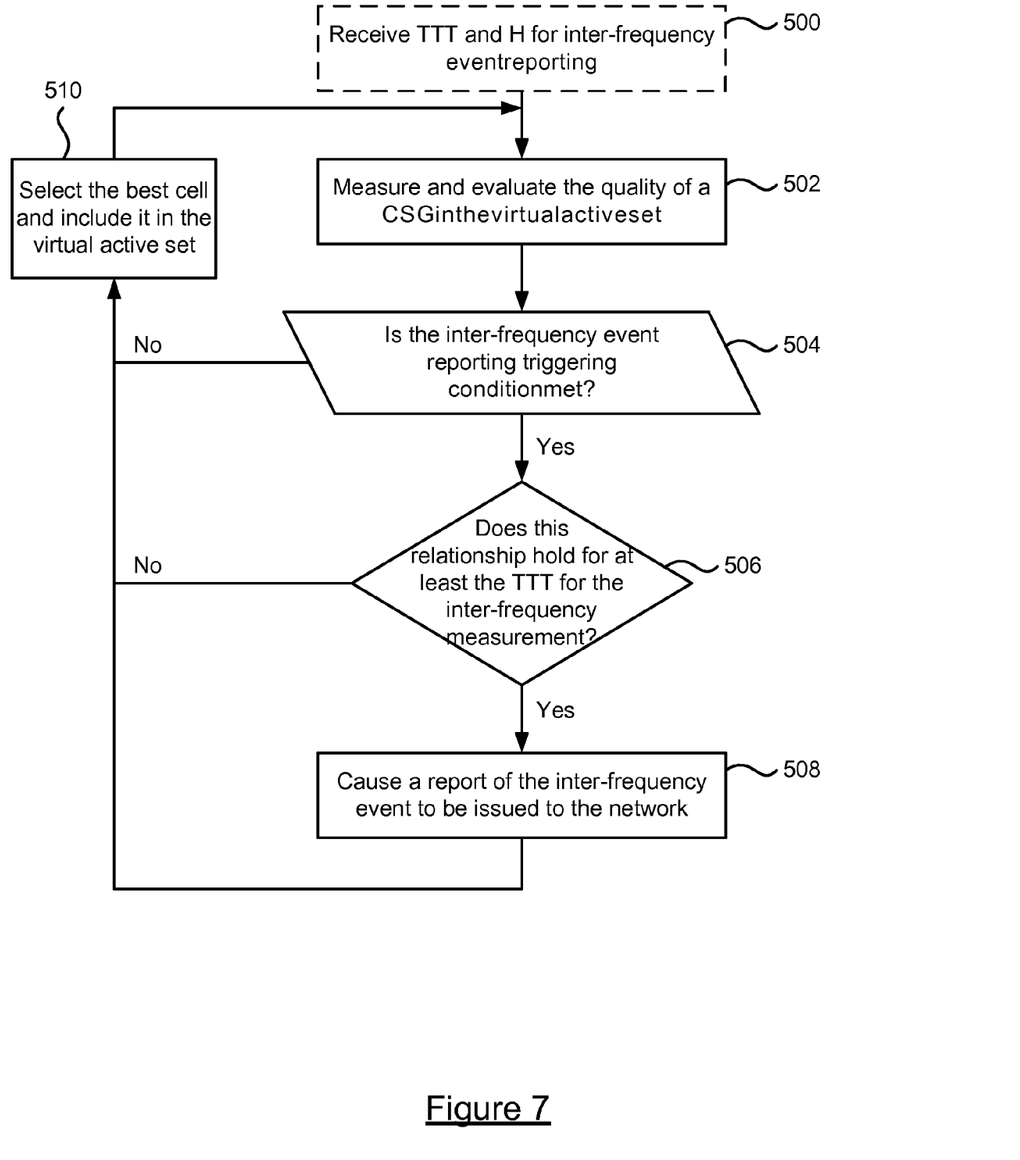
FIG. 7 is a flow chart illustrating operations performed by a mobile terminal in order to provide for inter-frequency event reporting in accordance with another embodiment of the present invention.

In another embodiment depicted in FIGS. 6 and 7, the mobile terminal 102, such as the processor 20, does not automatically update the virtual active set in instances in which the criteria for updating the virtual active set has been met. Instead, the mobile terminal may determine if the quality of the CSG cell that currently comprises the virtual active set also satisfies the triggering condition for inter-frequency measurement reporting and, if so, may forego any updating of the virtual active set and may proceed to provide the inter-frequency event reporting, as described below in conjunction with FIG. 5. Indeed, in this instance, the CSG cell that comprises the virtual active set may be the CSG cell that has had the greatest downlink signal quality, such as in terms of Ec/N0 or RSCP, after dispreading or that has had the lowest downlink path loss.

After providing the inter-frequency reporting, the CSG cell 110 that provides the best measurement results may then be identified by the mobile terminal 102, such as the processor 20, as the CSG cell that comprises the virtual active set.

As shown in FIG. 6, the mobile terminal 102, such as the processor 20, may perform many of the same operations as set forth in FIG. 4 and described above. In this regard, operations 400-408 of FIG. 6 are the same as operations 200-210, respectively, of FIG. 4 and have therefore been described above in conjunction with the embodiment of FIG. 4. In FIG. 6, however, following the determination that the measurement results for another CSG cell have been better for at least a predetermined period of time, such as the TTT, than those of the CSG cell that currently comprises the virtual active set (such as by, e.g., satisfying an intra-frequency event reporting triggering condition), the mobile terminal, such as the processor, may determine if the CSG cell that currently forms the virtual active set fulfills a predefined inter-frequency event reporting condition. See operation 410. If so, the mobile terminal, such as the processor, waits until the best cell has been selected and included in the virtual active set prior to updating the virtual active set. See operation 412. Alternatively, if the mobile terminal determines that the CSG cell of the virtual active set does not fulfill the inter-frequency event reporting triggering condition, the mobile terminal, such as the processor, proceeds to update the virtual active set with the other CSG cell. See operation 414.

Although the mobile terminal 102 waits to update the virtual active set if the CSG cell of the virtual active set fulfills the inter-frequency event reporting triggering condition, the mobile terminal of this embodiment may proceed to cause a report of the inter-frequency event to be issued to the network, such as the RNC 108. As shown in FIG. 7, for example, the mobile terminal, such as the processor 20, may perform many of the same operations as set forth in FIG. 5 and described above in regards to inter-frequency event reporting. In this regard, operations 500-504 of FIG. 7 are the same as operations 300-304, respectively, of FIG. 5 and have therefore been described above in conjunction with the embodiment of FIG. 5. In FIG. 7, however, following the determination that the inter-frequency reporting triggering condition is met, the mobile terminal, such as the processor, of one embodiment may determine if the inter-frequency event reporting triggering condition has been met for a predetermined period of time, such as the TTT associated with inter-frequency measurements. See operation 506. If the inter-frequency event reporting triggering condition has been met for the predetermined period of time, the mobile terminal, such as the processor, may cause a report of the inter-frequency event to be issued to the network, such as the RNC. See operation 508. Thereafter, the mobile terminal may select the best CSG cell, such as in terms of downlink signal strength, downlink path loss or the like, and then update the virtual active set to include the best CSG cell prior to repeating the foregoing process. See operation 510. Alternatively, if the inter-frequency event reporting triggering condition has not been met for a predetermined period of time, the mobile terminal may forego the issuance of a report and may, instead, simply update the virtual active set to include the best CSG cell prior to repeating the foregoing process.

As described above FIGS. 4-7 are flowcharts of an apparatus, method, and computer program product according to exemplary embodiments of the invention. As also described above, each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product that is performed by the mobile terminal 102 in accordance with FIGS. 4-7 may be stored by one or more memory devices 40, 42 of the mobile terminal and executed by the processor 20 of the mobile terminal. In some embodiments, the computer program instructions comprising the computer program product(s) which embody the procedures described above may be stored by memory devices of a plurality of computing devices, such as the mobile terminal. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., the mobile terminal) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions for performing the specified functions. It will also be understood that one or more blocks of the flowchart, and combinations of blocks in the flowchart, may be implemented by special purpose hardware-based computer systems which perform the specified functions or combinations of special purpose hardware and computer program product(s).

The above described functions may be carried out in many ways. For example, any suitable means for carrying out each of the functions described above may be employed to carry out embodiments of the invention. In one embodiment, suitably configured processors 20, 120 of the mobile terminal 10 and the network node 104, respectively, may provide means for performing their respective functions, as shown in FIGS. 4-7 and described above. In another embodiment, all or a portion of the operations, such as shown in FIGS. 4-7, may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing description and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed is:

1. A method comprising:
    establishing a virtual active set including a first closed subscriber group (CSG) cell;
    measuring at least one parameter of each of the first CSG cell and a second CSG cell; and
    updating the virtual active set by replacing the first CSG cell with the second CSG cell in response to the at least one parameter of the second CSG cell having a predefined relationship with respect to the at least one parameter of the first CSG cell for a time to trigger.

2. A method according to claim 1 wherein establishing the virtual active set and updating the virtual active set comprise insuring that the virtual active set only includes a single CSG cell.

3. A method according to claim 1 wherein establishing the virtual active set and updating the virtual active set comprises insuring that the virtual active set only includes CSG cells and is free of macro cells.

4. A method according to claim 1 wherein updating the virtual active set further comprises updating the virtual active set by replacing the first CSG cell with the second CSG cell in response to the at least one parameter of the second CSG cell differing from the at least one parameter of the first CSG cell in accordance with the predefined relationship by at least a predefined amount for the time to trigger.

5. A method according to claim 4 further comprising receiving a message from a network that defines the predefined amount and the time to trigger.

6. A method according to claim 1 wherein updating the virtual active set further comprises updating the virtual active set only in an instance in which criteria associated with an inter-frequency event reporting triggering condition is also satisfied.

7. A apparatus comprising at least one processor and at least one memory including computer program code, the at least one memory and the computer program code configured to, with the at least one processor, cause the apparatus at least to:
    establish a virtual active set including a first closed subscriber group (CSG) cell;
    measure at least one parameter of each of the first CSG cell and a second CSG cell; and
    update the virtual active set by replacing the first CSG cell with the second CSG cell in response to the at least one parameter of the second CSG cell having a predefined relationship with respect to the at least one parameter of the first CSG cell for a time to trigger.

8. An apparatus according to claim 7 wherein the at least one memory and the computer program code are configured to, with the at least one processor, cause the apparatus to establish the virtual active set and update the virtual active set by insuring that the virtual active set only includes a single CSG cell.

9. An apparatus according to claim 7 wherein the at least one memory and the computer program code are configured to, with the at least one processor, cause the apparatus to establish the virtual active set and update the virtual active set by insuring that the virtual active set only includes CSG cells and is free of macro cells.

10. An apparatus according to claim 7 wherein the at least one memory and the computer program code are configured to, with the at least one processor, cause the apparatus to update the virtual active set by updating the virtual active set by replacing the first CSG cell with the second CSG cell in response to the at least one parameter of the second CSG cell differing from the at least one parameter of the first CSG cell in accordance with the predefined relationship by at least a predefined amount for the time to trigger.

11. An apparatus according to claim 10 wherein the at least one memory and the computer program code are further configured to, with the at least one processor, cause the apparatus to receive a message from a network that defines the predefined amount and the time to trigger.

12. An apparatus according to claim 7 wherein the at least one memory and the computer program code are configured to, with the at least one processor, cause the apparatus to update the virtual active set by updating the virtual active set only in an instance in which criteria associated with an inter-frequency event reporting triggering condition is also satisfied.

13. A computer program product comprising at least one computer-readable storage medium having computer-executable program code instructions stored therein, the computer-executable program code instructions comprising:
   program code instructions for establishing a virtual active set including a first closed subscriber group (CSG) cell;
   program code instructions for measuring at least one parameter of each of the first CSG cell and a second CSG cell; and
   program code instructions for updating the virtual active set by replacing the first CSG cell with the second CSG cell in response to the at least one parameter of the second CSG cell having a predefined relationship with respect to the at least one parameter of the first CSG cell for a time to trigger.

14. A computer program product according to claim 13 wherein the program code instructions for establishing the virtual active set and updating the virtual active set comprise program code instructions for insuring that the virtual active set only includes a single CSG cell.

15. A computer program product according to claim 13 wherein the program code instructions for establishing the virtual active set and updating the virtual active set comprise insuring that the virtual active set only includes CSG cells and is free of macro cells.

16. A computer program product according to claim 13 wherein the program code instructions for updating the virtual active set further comprise program code instructions for updating the virtual active set by replacing the first CSG cell with the second CSG cell in response to the at least one parameter of the second CSG cell differing from the at least one parameter of the first CSG cell in accordance with the predefined relationship by at least a predefined amount for the time to trigger.

17. A computer program product according to claim 16 further comprising program code instructions for receiving a message from a network that defines the predefined amount and the time to trigger.

18. A computer program product according to claim 13 wherein the program code instructions for updating the virtual active set further comprise program code instructions for updating the virtual active set only in an instance in which criteria associated with an inter-frequency event reporting triggering condition is also satisfied.

* * * * *